Patented May 25, 1954

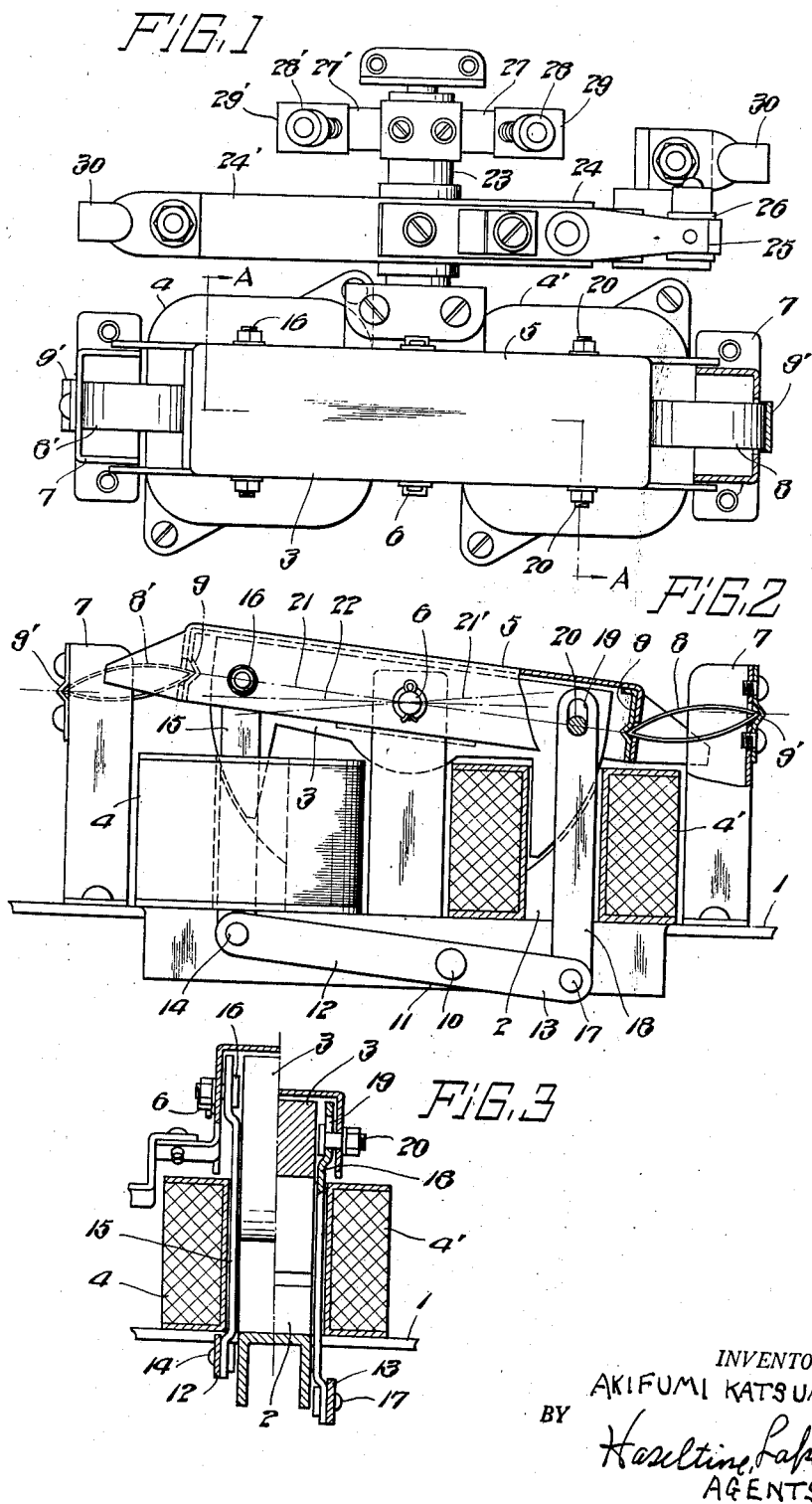

2,679,563

UNITED STATES PATENT OFFICE 2,679,563

ELECTROMAGNETIC SWITCH

Akifumi Katsumata, Numatsu, Japan

Application December 3, 1951, Serial No. 259,527

Claims priority, application Japan May 31, 1951

3 Claims. (Cl. 200—98)

This invention relates to an electro-magnetic switch, and more particularly to an electro-magnetic switch or the like in which a moving iron core and a movable cover are coaxially and rotatably disposed on an axis and the movable cover is biased by two pairs of convex lens-shaped springs which are formed by bending a plurality of resilient plates acting upon both ends of the movable cover.

The object of this invention is to provide an electro-magnetic switch which is capable of doing rapid change-over motion or quick reverse operation with comparatively small electric power consumption.

In an ordinary electro-magnetic switch, consideration must be given to the installation of the switch so as not to be affected by gravity and such a switch can not be adapted for use at any place where vibration may occur.

Accordingly, another object of this invention is to provide an electro-magnetic switch which is compact in construction and positive in operation and is adapted to be used at any desired installation posture, for many places or structures such as land vehicles, aircraft and ships which are always subject to vibrations.

In accordance with this invention, there are provided a moving iron core of an electro-magnet and a movable cover which are coaxially and rotatably disposed on a same axis and the movable cover is biased by two pairs of convex lens shaped springs each of which is formed by bending a plurality of resilient plates between each end of the movable cover and a stationary part. The electro-magnet has two operating coils. On either the movable cover or the moving iron core is provided a contact for controlling a main circuit and two pairs of auxiliary contact members respectively controlling supply circuits of the operating coils.

On the energization of either one of the operating coils, the moving iron core or the movable cover rotates in one direction against the convex lens shaped springs to control the main circuit. At this movement, the operating coil is cut off and de-energized by opening action of one pair of the auxiliary contact members. On the contrary, when the other coil is energized through the other pair of auxiliary contact members, the moving iron core or the movable cover is rotated in the opposite direction against the springs to control the main circuit in the reverse condition with regard to that above described. Upon this reverse operation, the latter pair of the auxiliary contacts, in turn, open to stop the current passing through the coil.

Thus the electro-magnet repeats the above described operation and the current passes either one of the two operating coils only at the moment of the change-over operation and accordingly electric power consumption does not always occur.

In order to reduce the electric power consumption, a link mechanism is provided for connecting the moving iron core to the movable cover. This link mechanism has a loose coupling means which is disposed between a dead point and a limiting position of rotating motion of the movable cover for connecting loosely the movable cover to a link forming the end part of the link mechanism. By this arrangement the movable cover can be rotated and the electric power consumption is reduced corresponding to the lever ratio of the link mechanism in spite of the rotating direction of the movable cover. Moreover, one part of the link mechanism is arranged through the narrow aperture formed between the iron core of the electro-magnet and the coil attached thereon so that the switch according to this invention can be constructed comparatively small and compact in size.

The electro-magnetic switch according to this invention can be installed at any desired position on account of having no operating part which is affected by gravity. The switch also has the advantage that the convex lens shaped springs maintain the moving iron core and the movable cover at their stable operating positions against vibrations, whereas the switch can be reversed in a rapid motion of about within 0.01 second with comparatively small torque in practice.

Moreover, the switch described above is compact and light because of the fact that only one electro-magnet is enough to cause each movement in opposite directions and that the other constructions are also simple. Accordingly the switch is especially advantageous to use for automatic interchanging operation between an ordinary electric power source and an emergency one such as in trains, ships or other means of communication.

This invention will be more clearly understood by reference to the attached drawing showing, by way of example, some embodiments thereof.

Referring to the drawing, Fig. 1 is a plan view of an electro-magnetic switch embodying this invention; Fig. 2 is an elevation of the switch shown in Fig. 1, one part thereof being cut off and Fig. 3 is a sectional side view of the switch, the section being taken on the line A—A of Fig. 1.

Referring to the drawings, 1 represents a base;

2 is a fixed iron core of an electro-magnet; 3 a moving iron core; 4 and 4' designate operating coils respectively. 5 is a movable cover.

In accordance with this invention, the moving iron core 3 and the movable cover 5 are coaxially and rotatably mounted about an axis 6. The movable cover 5 is biased by two pairs of convex lens shaped springs 8, 8', each of which is formed by bending a plurality of resilient plates between each end of the movable cover 5 and a stationary part 7. That is, the ends of the movable cover 5 and the stationary parts 7 are respectively provided with V-shaped receiving pieces 9 and 9', in the inmost recesses of which the ends of the convex lens shaped springs are respectively engaged with the pieces. On a point 10 of the base 1 is pivoted a lever 11 consisting of a long arm 12 and a short arm 13. On one hand, at the end of the long arm of the pivoted lever 11 is pivoted, at 14, one end of a link 15, the other end of which is pivoted, at 16, to the moving iron core 3, the link 15 being arranged in a narrow space formed between the iron core and the operating coil 4. On the other hand, at the end of the short arm 13 of the pivoted lever 11 is also pivoted, at 17, one end of another link 18, the opposite end of which is associated with the movable cover 5 through a loose coupling means, the link 18 being also arranged in a narrow space formed between the iron core and the other operating coil 4'. The loose coupling means consists of a longitudinal slot 19 which is formed at the end of the link 18 and a pin 20 which is secured on the movable cover 5 and is slidable within the slot. The length of the slot 19 is so chosen that one end of the slot is substantially aligned with the dotted line 21 passing through the inner supporting points of the springs 8 and 8' and the other end thereof with the chain-dotted line 22 passing through the outer supporting points of the springs, the lines 21 and 22 intersecting the axis 6, so that the pin 20 can be quickly and slidably moved within the slot from the dead point coinciding with the chain-dotted line 22 to a limited position of rotation of the movable cover as soon as the pin passes through the dead point. In this case, the slot may be formed in the movable cover and the pin secured on the link. The arrangement need not always be limited to the pin and the slot but any desired loose coupling means may be used which may loosely connect the link 18 to the movable cover 5 over the range from the dead point to the limited position of motion of the movable cover.

A horizontal bar 23 is extended from the center position of the movable cover 5. On the bar 23 are mounted, parallel to the movable cover 5, arms 24 and 24', of which the former has a contact 25 on its end co-operating with a stationary contact 26 to control a main circuit. 30 is a terminal of the main circuit. Another pair of arms 27 and 27' are mounted on the bar 23. The arm 27 and 27' have auxiliary contacts 28 and 28' on their ends which respectively co-operate with stationary contacts 29 and 29' to supply circuits of the operating coils 4 and 4' of the electro-magnet. That is, the auxiliary contact members 28 and 29 are inserted into the supply circuit of the coil 4, the circuit being closed in the position shown in Fig. 2. On the contrary, the contact members 28' and 29' are inserted in the supply circuit of the coil 4', and are maintained at the opened position in the present state.

The operation of the electro-magnetic switch according to this invention is as follows:

Assuming that the main circuit is closed by the contacts 25 and 26 in the position of the switch as shown in Fig. 2. Now, in order to open the main circuit, the operating coil 4 is energized by a current passing through the auxiliary contact members 28 and 29 which have been in closed position. Then the moving iron core 3 is caused to rotate in a counter-clockwise direction and the left end of the lever 12 is downwardly pressed and accordingly the right end of the lever is lifted to push the link 18 upwardly. Since the pin 20 has been engaged with the lower edge of the slot 19, the pin and the right ends of the movable cover 5 are lifted, against the springs 8 and 8', immediately when the link begins to move. As soon as the pin 20 passes through the dead point existing on the chain-dotted line 22, the inner supporting portions of the springs 8 and 8' may also be moved across the line 22 so that the movable cover 5 with the pin turns with a snap in the counter-clockwise direction. At this converted position the pin 20 reaches the dotted line 21' and abuts against the upper edge of the slot 19. At the operation of this conversion, the contacts 25 and 26 are opened to break the main circuit, and at the same time the auxiliary contact members 28 and 29 are also opened to stop the current passing through the operating coil 4 and the auxiliary contact members 28' and 29' are closed to prepare for the next operation of the switch. That is, when the coil 4' is energized by a current passing through the auxiliary contact members 28' and 29' in order to close the switch the moving iron core 3, in turn, rotates in the clockwise direction to draw the link 15 upwardly so that the link 18 is drawn downwardly through the lever 11. At this time the pin 20 which has been abutting against the upper edge of the slot 19 and the movable cover 5 connected thereto are rotated in the clockwise direction, namely in the opposite direction to that described above, against the springs 8 and 8', and are reversed with a snap to the state shown in Fig. 2 as soon as they pass through the chain-dotted line 22.

According to this invention, the number of ampere turns used to reverse the moving iron core and accordingly the movable cover against the convex lens shaped springs may be reduced corresponding to the lever ratio of the lever 11. In other words, the electric power to be consumed for producing the torque is reduced corresponding to the lever ratio, if the other conditions are equal. In practice, an electro-magnetic switch according to this invention can be operated with 50% of electric power or less as compared with an ordinary switch of the same type. This invention has the advantage that the link mechanism thereof is very simple and the reciprocal reverse operation can be attained positively.

What is claimed is:

1. An electro-magnetic switch comprising a movable iron core having opposed end portions and a movable cover mounted coaxially for rotation with a same axis, two pairs of convex lens shaped springs each of which comprises a plurality of bent resilient plates between each end of said movable cover and a stationary part, two operating coils each of which acts on the opposed end portions of said movable iron core to rotate said movable iron core respectively in the opposite directions in opposition to said convex lens shaped springs, a link mechanism for connecting said moving iron core to said movable cover, one part of said link mechanism passing through a narrow aperture formed between said movable iron core and said operating coil and a loose coupling means which is disposed between a dead point laid on the line passing through the two outer supporting points of said two convex lens shaped springs and a limiting position of rotating motion of said movable cover for connecting loosely said movable cover to a link forming the end part of said link mechanism.

2. An electro-magnetic switch comprising a movable iron core having opposed end portions and a movable cover mounted coaxially for rotation about a same axis, two pairs of convex lens shaped springs each of which comprises a plurality of bent resilient plates between each end of said movable cover and a stationary part, two operating coils each of which acts on the opposed end portions of said movable iron core to rotate said movable iron core respectively in opposite directions in opposition to said convex lens shaped springs, a link mechanism having a pivoted lever pivoted on a point of a stationary part, a link one end of which is pivoted at the long arm end of said pivoted lever and the other end, passing through a narrow aperture formed between said movable iron core and one of said operating coils, pivoted at said moving iron core and another link one end of which is pivoted at the short arm end of said pivoted lever and the other end, passing through a narrow aperture formed between said movable iron core and the other of said operating coils, associated with said movable cover, a loose coupling means consisting of a longitudinal slot which is formed at the end of said latter link so as to cross, at one end thereof, with a line passing through the two inner supported ends of said two convex lens shaped springs and, at the other end thereof, with another line passing through the two outer supported ends of said springs and a pin which is secured on said movable cover to insert loosely in said slot, a bar attached on said movable cover, a movable contact fixed to said bar for controlling a main circuit and two pairs of auxiliary contacts fixed to said bar for controlling the supply circuit of said operating coils.

3. An electro-magnetic switch comprising a movable iron core having opposed end portions and a movable cover mounted coaxially for rotation about a same axis, two pairs of convex lens shaped springs each of which comprises a plurality of bent resilient plates between the ends of said moving iron core and a stationary part, said movable iron core and said stationary part being respectively provided with V-shaped receiving pieces, in the inmost recess of which the ends of said convex lens shaped springs are respectively engaged with said V-shaped receiving pieces, two operating coils each of which acts on the opposed end portions of said movable iron core to rotate said movable iron core respectively in opposite directions in opposition to said convex lens shaped springs, a link mechanism having a pivoted lever pivoted on a point of a stationary part, a link one end of which is pivoted at the long arm end of said pivoted lever and the other end, passing through a narrow aperture formed between said movable iron core and one of said operating coils, and another link one end of which is pivoted at the short arm end of said pivoted lever and the other end associated, passing through a narrow aperture formed between said movable iron core and of the other of said operating coils, with said movable cover, a loose coupling means consisting of a longitudinal slot which is formed at the end of said latter link so as to cross, at one end thereof, with a line passing through the two inner supported ends of said two convex lens shaped springs and, at the other end thereof, with another line passing through the two outer supported ends of said springs and a pin which is secured on said movable cover to insert loosely in said slot, a horizontal bar extending from the center position of said movable cover, a movable contact attached to an arm which is mounted, parallel to said movable cover, on said horizontal bar for controlling a main circuit and two pairs of auxiliary contacts attached to another arm which is also mounted, parallel to said movable cover, on said horizontal bar for controlling the supply circuits of said operating coils respectively.

References Cited in the file of this patent

UNITED STATES PATENTS

| Number | Name | Date |
|---|---|---|
| 1,281,392 | Kelly | Oct. 15, 1918 |
| 1,559,110 | Leddick | Oct. 27, 1925 |
| 1,954,365 | Reich | Apr. 10, 1934 |
| 2,236,318 | Lamel et al. | Mar. 25, 1941 |
| 2,528,777 | Persons | Nov. 7, 1950 |

FOREIGN PATENTS

| Number | Country | Date |
|---|---|---|
| 309,096 | Great Britain | Mar. 25, 1929 |